US008050407B2

(12) United States Patent
Hughes et al.

(10) Patent No.: US 8,050,407 B2
(45) Date of Patent: Nov. 1, 2011

(54) METHOD AND SYSTEM FOR PROTECTING KEYS

(75) Inventors: James P. Hughes, Palo Alto, CA (US); Alexander S. Stewart, Louisville, CO (US); Dwayne A. Edling, Longmont, CO (US)

(73) Assignee: Oracle America, Inc., Redwood City, IA (US)

( * ) Notice: Subject to any disclaimer, the term of this patent is extended or adjusted under 35 U.S.C. 154(b) by 945 days.

(21) Appl. No.: 11/516,885

(22) Filed: Sep. 7, 2006

(65) Prior Publication Data
US 2011/0176675 A1 Jul. 21, 2011

Related U.S. Application Data

(63) Continuation-in-part of application No. 11/403,109, filed on Apr. 12, 2006, now Pat. No. 7,971,062.

(51) Int. Cl.
*H04L 9/00* (2006.01)
(52) U.S. Cl. .......................... 380/277; 380/279
(58) Field of Classification Search .......... 380/277–286, 380/44–47
See application file for complete search history.

(56) References Cited

U.S. PATENT DOCUMENTS

| | | | | |
|---|---|---|---|---|
| 5,208,853 A * | 5/1993 | Armbruster et al. | ............. | 705/56 |
| 5,313,521 A * | 5/1994 | Torii et al. | ...................... | 380/281 |
| 5,604,801 A | 2/1997 | Dolan et al. | | |
| 5,623,546 A | 4/1997 | Hardy et al. | | |
| 5,745,571 A * | 4/1998 | Zuk | .............................. | 380/285 |
| 6,134,237 A * | 10/2000 | Brailean et al. | ............... | 370/394 |
| 6,351,813 B1 | 2/2002 | Mooney et al. | | |
| 6,363,423 B1 * | 3/2002 | Chiles et al. | ................... | 709/224 |
| 6,708,272 B1 | 3/2004 | McCown et al. | | |
| 6,934,839 B1 * | 8/2005 | Pagel | ............................. | 713/156 |
| 6,957,330 B1 | 10/2005 | Hughes | | |
| 7,023,801 B1 * | 4/2006 | Hollins | ......................... | 370/235 |
| 7,062,045 B2 * | 6/2006 | Riddick et al. | ................... | 380/44 |
| 7,420,596 B2 | 9/2008 | Niimura | | |
| 2003/0182565 A1 * | 9/2003 | Nakano et al. | ................. | 713/193 |
| 2003/0196106 A1 * | 10/2003 | Erfani et al. | ................... | 713/200 |
| 2004/0083091 A1 | 4/2004 | Ie et al. | | |
| 2004/0103292 A1 | 5/2004 | Shirouzu | | |
| 2004/0125782 A1 | 7/2004 | Chang | | |
| 2004/0208316 A1 | 10/2004 | Wack et al. | | |
| 2005/0021941 A1 | 1/2005 | Ohmori et al. | | |
| 2005/0108560 A1 | 5/2005 | Han et al. | | |
| 2005/0246553 A1 * | 11/2005 | Nakamura et al. | ............. | 713/193 |

OTHER PUBLICATIONS

Schneier, "Applied Cryptrography Second Edition", 1996, Wiley & Sons, pp. 357-363 and 513-514.*
TRA "Understanding IP Network Security", 2005, TRA.*
Schneier, "Applied Cryptography", 1996, Wiley and Sons, 2nd edition, 75-76, 183-184, 167-177, 357.*
Schneier, Applied Cryptography, 1996, pp. 28-34 and 367-368.*

(Continued)

*Primary Examiner* — Edan Orgad
*Assistant Examiner* — Brian Olion
(74) *Attorney, Agent, or Firm* — Brooks Kushman P.C.

(57) ABSTRACT

A method of protecting a media key including obtaining the media key, obtaining an auxiliary key, calculating a split key using the media key and the auxiliary key, encrypting the split key using a wrap key to generate an encrypted split key, assembling the encrypted split key and a communication key to obtain a data bundle, and sending the data bundle to a token, where the media key is extracted from the data bundle on the token to protect data on a storage device.

18 Claims, 6 Drawing Sheets

OTHER PUBLICATIONS

Final Office Action for U.S. Appl. No. 11/403,109 mailed May 7, 2010.
Office Action for U.S. Appl. No. 11/403,109 mailed Nov. 19, 2009.
Office Action for U.S. Appl. No. 11/403,109 mailed Jul. 6, 2009.
Office Action for U.S. Appl. No. 11/403,109 mailed Nov. 23, 2010.
Notice of Allowance and Fees Due for U.S. Appl. No. 11/403,109 dated Apr. 25, 2011.

* cited by examiner

METHOD AND SYSTEM FOR PROTECTING KEYS

CROSS-REFERENCE TO RELATED APPLICATIONS

The present application is a continuation-in-part of U.S. application Ser. No. 11/403,109 entitled: "Token-Based Encryption Key Secure Conveyance," filed on Apr. 12, 2006, now U.S. Pat. No. 7,971,062, issued Jun. 28, 2011.

STATEMENT REGARDING FEDERALLY SPONSORED RESEARCH OR DEVELOPMENT

The invention was made with U.S. Government support under Contract No. #2004*P125120*000. The U.S. Government may have certain rights to the invention.

BACKGROUND

Encryption is the process of protecting sensitive data. During encryption, the sensitive data is transformed into an encrypted form from which there is a very low probability of assigning meaning. In other words, the sensitive data becomes unintelligible to anyone and/or any machine unauthorized to access it. Accordingly, encryption has many uses both on a single machine and in all types of networks linking multiple machines.

Encryption often requires the use of an encrypting algorithm and one or more encryption keys. The encryption algorithm and the encryption keys work together to encode the sensitive data and at a future time, decode (i.e., decrypt) the sensitive data. The encryption keys may be of any length required by the encryption algorithm. As the encryption keys are of paramount importance during the encryption process and decryption process, the encryption keys should be protected from unauthorized individuals and machines. Accordingly, the encryption keys should never appear as clear text outside of a secure environment.

SUMMARY

In general, in one aspect, the invention relates to a method of protecting a media key including obtaining the media key, obtaining an auxiliary key, calculating a split key using the media key and the auxiliary key, encrypting the split key using a wrap key to generate an encrypted split key, assembling the encrypted split key and a communication key to obtain a data bundle, and sending the data bundle to a token, where the media key is extracted from the data bundle on the token to protect data on a storage device.

In general, in one aspect, the invention relates to a method of obtaining a media key including receiving a broadcast message including a first identification number, where the first identification number is associated with a storage device, sending a message comprising a second identification number, where the second identification number is associated with the storage device, receiving an encrypted data bundle after sending the message, decrypting the encrypted data bundle using a communication key to obtain a protected media key, decrypting the protected media key using a wrap key to obtain a split key, and performing an exclusive-or operation using an auxiliary key and the split key to obtain the media key, where the media key is used to protect data on the storage device.

In general, in one aspect, the invention relates to a method of protecting device keys including obtaining a default communication key, obtaining a first auxiliary key, a first wrap key, and a first communication key, encrypting the first auxiliary key, the first wrap key, and the first communication key using the default communication key, and sending the encrypted first auxiliary key, the encrypted first wrap key, and the encrypted first communication key to a token, where the encrypted first device key, the encrypted first wrap key, and the encrypted first communication key on the token are device keys used for protecting a first media key, where the first media key is used to protect data on a storage device.

In general, in one aspect, the invention relates to a system for storing data including a key management station configured to protect a media key, a token configured to store the protected media key transferred from the key management station by a link, and a storage device configured to access the token and obtain the media key, where the media key is used for protecting data on the storage device.

Other aspects of the invention will be apparent from the following description and the appended claims.

DETAILED DESCRIPTION

Figure 1:
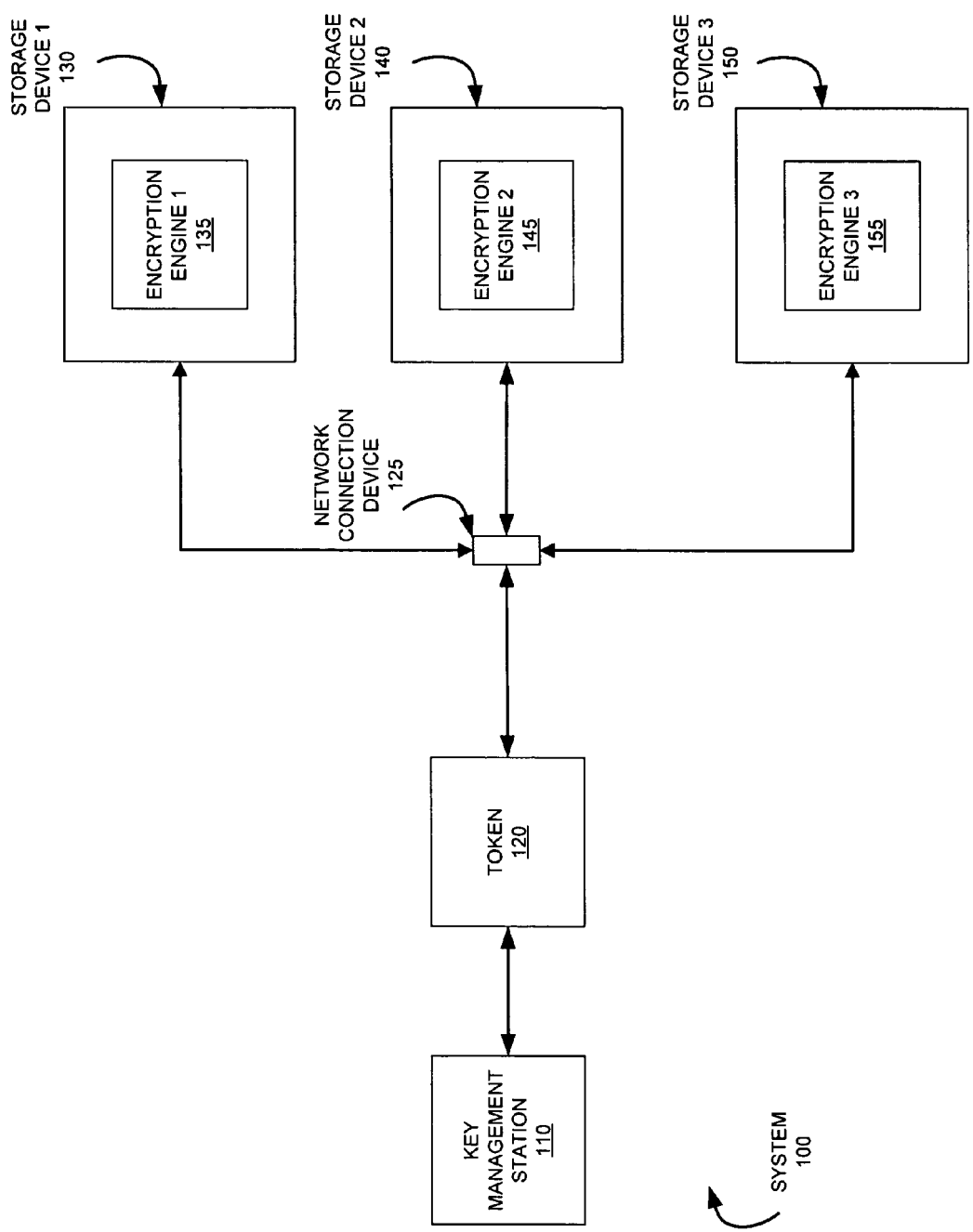
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to protect a media key using one or more device keys, where the media key is used to encrypt and/or decrypt data on a storage device. Specifically, embodiments of the invention provide a method and system to protect a media key stored on a token while being transferred between a key management station and a storage device. Further still, embodiments of the invention provide a method and system to protect device keys being transferred on a token between a key management station and a storage device.

FIG. 1 shows a system in accordance with one or more embodiments of the invention. As shown in FIG. 1, System (100) may have a key management station (110), a token (120), and one or more storage devices (e.g., Storage Device 1 (130), Storage Device 2 (140), Storage Device 3 (150)). The storage devices may be connected by a public or private, local, or wide area network (e.g., the Internet), with wired and/or wireless segments. Further, each storage device may have an embedded encryption engine (e.g., Encryption Engine 1 (135), Encryption Engine 2 (145), Encryption Engine 3 (155)). Token (120) may be configured to connect with Key Management Station (110) using a link with wired and/or wireless segments. Token (120) may also be configured to join the network connecting the one or more storage devices using a network connection device (125) and a wired and/or wireless link. Each of these components is described below.

In one or more embodiments of the invention, the one or more storage devices (e.g., Storage Device 1 (130), Storage Device 2 (140), Storage Device 3 (150)) are responsible for storing data. Each storage device may have a processor, volatile memory, non-volatile memory, and any storage medium (e.g., disk, optical disk, tape, microelectromechanical systems, etc.) to store the data. In one or more embodiments of the invention, the storage medium is used to store user data, while control data (e.g., media keys, device keys, etc.) (discussed below) is stored elsewhere internally within the storage device (e.g., volatile memory, non-volatile memory, etc.). Further, each storage device may encrypt the data being stored using an encryption engine (e.g., Encryption Engine 1 (135), Encryption Engine 2 (145), Encryption Engine 3 (145)). In one or more embodiments of the invention, each storage device may have a unique identification number (e.g., a serial number) identifying the storage device.

In one or more embodiments of the invention, the data being stored on the one or more storage devices is encrypted using a media key (discussed below). Each storage device may have one or more media keys to encrypt the data. In one or more embodiments of the invention, each media key is associated with a media key identification (ID). The media key ID may be, for example, a numeric value (e.g., an integer) or an alphanumeric value. When data is encrypted with a media key and stored on the storage medium, the media key ID corresponding to the media key may also be stored with the encrypted data. Those skilled in the art, having the benefit of this detailed description, will appreciate that since only the media key ID is stored with the encrypted data and since the media key ID may have no mathematical relationship to the actual media key, an addition level of protection is granted to the media key.

In one or more embodiments of the invention, the media keys and the corresponding media key IDs may be stored in volatile memory (not shown) in the storage device. In one or more embodiments of the invention, multiple storage devices may share identical media keys. The media keys and corresponding media key IDs may be erased from the volatile memory by a reset function or simply by power cycling the drive. In one or more embodiments of the invention, the reset function may be used when the storage device is being removed for repair or reassignment to ensure that values of device keys are erased. From this reset state, the storage device may be re-initialized providing the default communication key (discussed below) and the identification number (e.g., the serial number) of the drive are available.

In one or more embodiments of the invention, each storage device may also store one or more device keys (discussed below) in non-volatile memory (not shown). In one or more embodiments of the invention, device keys are storage device specific (i.e., no two storage devices have identical device keys). When a storage device downloads the one or more device keys, the storage device may be forced into a permanent encrypting mode. In other words, prior to downloading the one or more device keys, the storage device may be configured to store data without encrypting the data (non-encrypting mode). However, after downloading one or more device keys, the storage device may be forced to operate only in the encrypting mode and thus, the storage device can never return to the non-encrypting mode.

Still referring to FIG. 1, in one or more embodiments of the invention, Key Management Station (KMS) (110) may be configured to provide the media keys, the corresponding media key IDs, and the device keys used by the one or more storage devices. KMS (110) may be a server, a mainframe, a desktop PC, a laptop, a PDA, a mobile phone, a kiosk, etc. The media keys, media key IDs, and the device keys may be generated by a random number generator (not shown), or may be obtained from another source (e.g., the manufacturer of a storage device, a user of KMS (110), etc.). KMS (110) may also be used to revoke and/or update media keys, media key IDs, and device keys. A user may access KMS (110) via a user interface (not shown) to manage the media keys, media key IDs, and/or the device keys. In one or more embodiments of the invention, KMS (110) is also capable of encrypting the device keys, the media keys, and the media key IDs.

In one or more embodiments of the invention, Token (120) includes a processor, non-volatile memory, and one or more interfaces capable of connecting to KMS (110) and/or Network Connection Device (125). In one or more embodiments of the invention, the connection between KMS (110) and Token (120) may be a short, direct connection that can be visually monitored to ensure no eavesdropping. The connection may be an Ethernet connection, a fiber optic connection, an infra-red connection, or any other type of connection that is known in the art.

As discussed above, Token (120) may also be configured to join the network connecting the one or more storage devices. In one or more embodiments of the invention, Token (120) may join the network by connecting to the Network Connection Device (125) with a wired and/or wireless link. In one or more embodiments of the invention, the connection between Token (120) and a storage device may also be a short, direct connection that can be visually monitored to ensure no eavesdropping. In one or more embodiments of the invention, Token (120) may be disconnected from KMS (110) prior to connecting with Network Connection Device (125). In one or more embodiments of the present invention, Token (120) may be powered off and/or physically relocated prior to connecting with Network Connection Device (125).

Still referring to FIG. 1, in one or more embodiments of the invention, Token (120) may be used to store media keys media key IDs, and/or device keys provided by KMS (110). In one or more embodiments of the invention, Token (120) does not store media keys and all the device keys at the same time. In one or more embodiments of the invention, Token (120) may be accessed by the one or more storage devices to retrieve the media keys, media key IDs, and/or device keys stored on Token (120). In one or more embodiments of the invention, Token (120) acts as local storage of media keys and media key IDs for the storage device through power cycles. When used for transmitting device keys, Token (120) may be referred to as an Enabling Token. When used for transmitting media keys and media key IDs, Token (120) may be referred to as an Operational Token.

Figure 2:
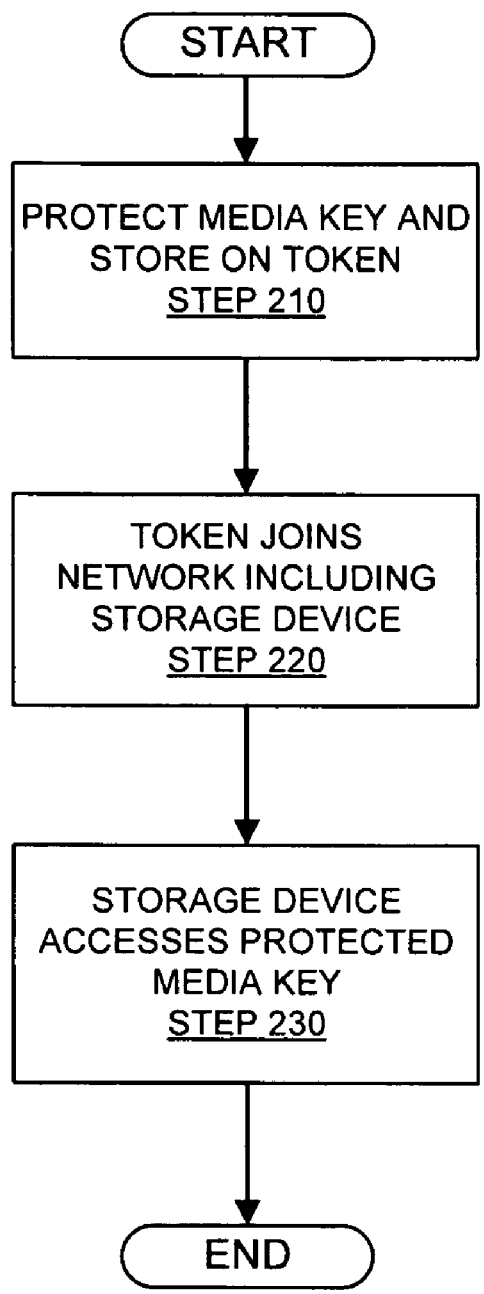
FIGS. 2-5 show flowcharts in accordance with one or more embodiments of the invention.

FIG. 2 shows a flowchart for using a media key in accordance with one or more embodiments of the invention. Each step that follows is discussed in detail below. In STEP 210, the media key and the associated media key ID are protected and stored on a token (e.g., Token (120) in FIG. 1). In STEP 220, the token joins the network including the storage device. In STEP 230, the storage device accesses the protected media key on the token to encrypt and/or decrypt data.

Figure 3:
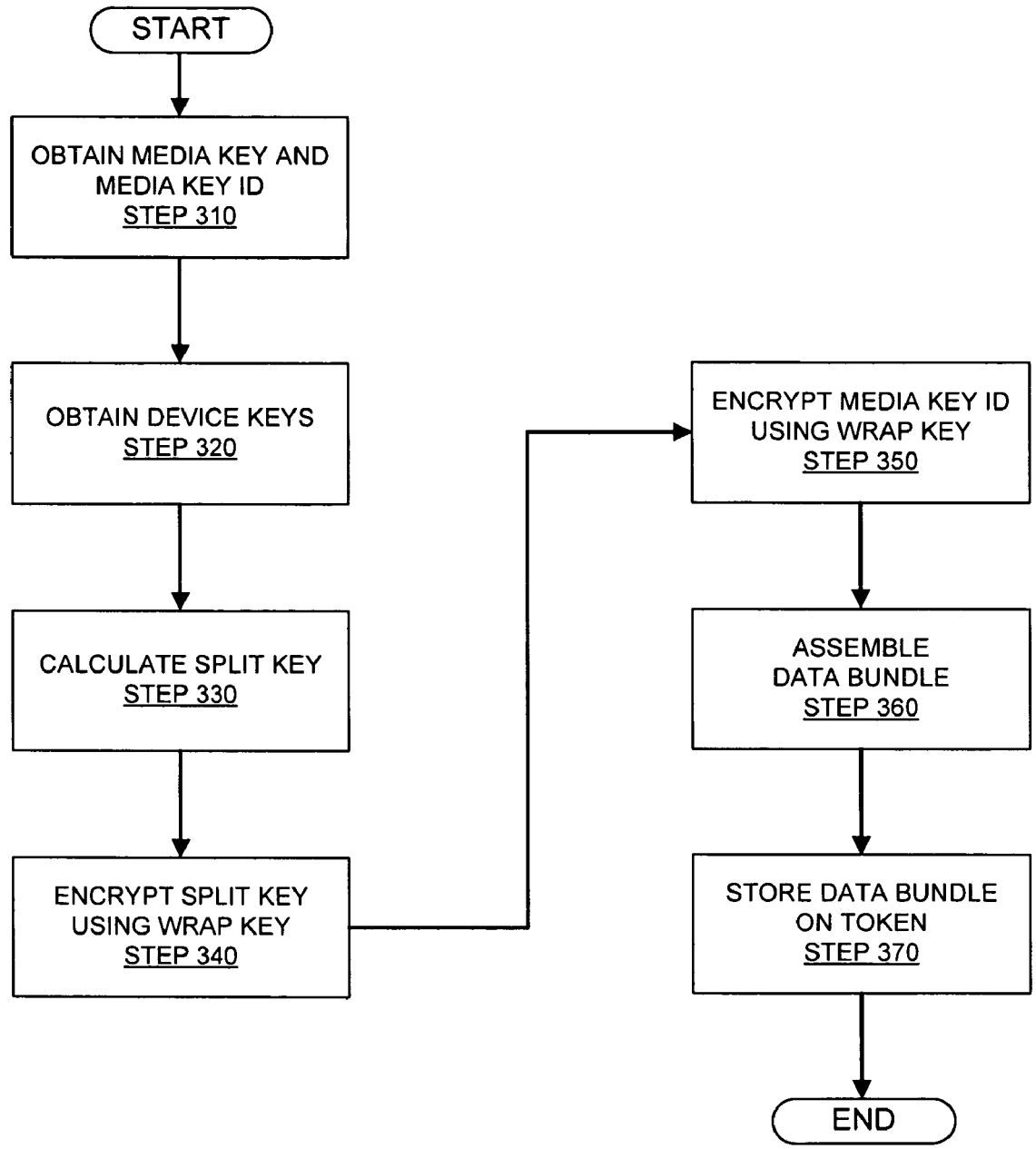

Initially, a media key and an associated media key ID are protected and stored on a token (STEP 210). FIG. 3 shows a flowchart for protecting a media key and storing the media key on a token in accordance with one or more embodiments of the invention. In STEP 310, the media key and its corresponding media key ID are obtained by the KMS. In STEP 320, the device keys are obtained by the KMS. In STEP 330, a split key is calculated using the media key and the auxiliary key. In STEP 340, the split key is encrypted using a wrap key. In STEP 350, the media key ID associated with the media key is encrypted. In STEP 360, a data bundle including the encrypted split key, the encrypted media key ID, and additional data is assembled. In STEP 370, the data bundle is stored on the token. Each step is described in greater detail below.

In STEP 310 and STEP 320, the KMS obtains the media key, the media key ID, and the device keys. As discussed above, the media key, the media key ID, and the device keys may be generated by the KMS (e.g., by a random number generator) or may have been provided to the KMS by another source (e.g., the manufacturer of a storage drive, a user of the KMS, etc.). Further, the KMS may use device keys that were generated in the past. The media keys and device keys may be of any suitable length. In one or more embodiments of the invention, the device keys are a set of three keys: an auxiliary key, a wrap key, and a communication key. Although the invention has been described as having three device keys, those skilled in the art will appreciate that more or fewer device keys may be used with different embodiments.

In STEP 330, the KMS calculates a split key. In one or more embodiments of the invention, the split key may be calculated by the equation:

$$TSkey = Mkey \oplus AUXkey \quad (1)$$

where TSkey is the split key, Mkey is the media key, and AUXkey is the auxiliary key. Those skilled in the art will appreciate that in such embodiments, the Mkey and AUXkey must be the same length. Those skilled in the art will also appreciate that TSkey is a split key because TSkey is a mathematical combination of two separate keys (i.e., Mkey and AUXkey) that individually convey no knowledge of TSkey.

In STEP 340, the KMS may encrypt the split key (i.e., TSkey) for one or more storage devices using a wrap key and a pre-defined encryption algorithm. In one or more embodiments of the invention, the pre-defined encryption algorithm may require additional parameters, such as a nonce. The nonce may include a creation time stamp associated with the media key. The nonce may be applied as an initialization vector to the encryption process. The result of the encryption process is an encrypted split key which may be referred to as the protected media key.

In STEP 350, the media key ID associated with the media key is encrypted by the KMS. In one or more embodiments of the invention, the media key ID is encrypted with the wrap key and the pre-defined encryption algorithm used in STEP 340. While the invention has been described in relation to a single pre-defined encryption algorithm, those skilled in the art will appreciate that a pre-defined encryption algorithm different from the one discussed in STEP 340 may be used. In one or more embodiments of the invention, the split key and the media key ID may be encrypted using the wrap key in a single encryption operation.

In STEP 360, the nonce, the encrypted split key (STEP 340), and the encrypted media key ID (STEP 350) are assembled into a data bundle and subsequently stored on the token (e.g., in the non-volatile memory of Token (120) in FIG. 1) (STEP 370). As discussed above, the token may be connected to the KMS by an Ethernet connection, a fiber optic connection, an infra-red connection, or any other type of connection that is known in the art. In one or more embodiments of the invention, the communication key (STEP 320) may be added to the data bundle on the token. In one or more embodiments of the invention, the communication key may be unique to the storage device destined to receive the media key (discussed below). In one or more embodiments of the invention, the KMS may also add an authentication tag to the data bundle to authenticate the data bundle.

Those skilled in the art will appreciate that the order and sequence of steps as shown in FIG. 3 may differ among embodiments of the invention. Further, those skilled in the art will also appreciate the steps shown in FIG. 3 may be repeated using a single encryption process or multiple encryption processes for any number of media keys destined for any number of storage devices.

Referring back to FIG. 2, in STEP 220, the token joins the network connecting the storage device. In one or more embodiments of the invention, the token may be powered off after storing the data bundle (STEP 370 in FIG. 3), disconnected from the KMS, and physically relocated closer to a network connection device (e.g., Network Connection Device (125) in FIG. 1) to join the network. In one or more embodiments of the invention, the token may already be physically connected (e.g., via a link with wired and/or wireless segments) to the network through the network connection device, but does not attempt to join the network until the KMS has finished storing the data bundle on the token (STEP 370 in FIG. 3).

Figure 4:
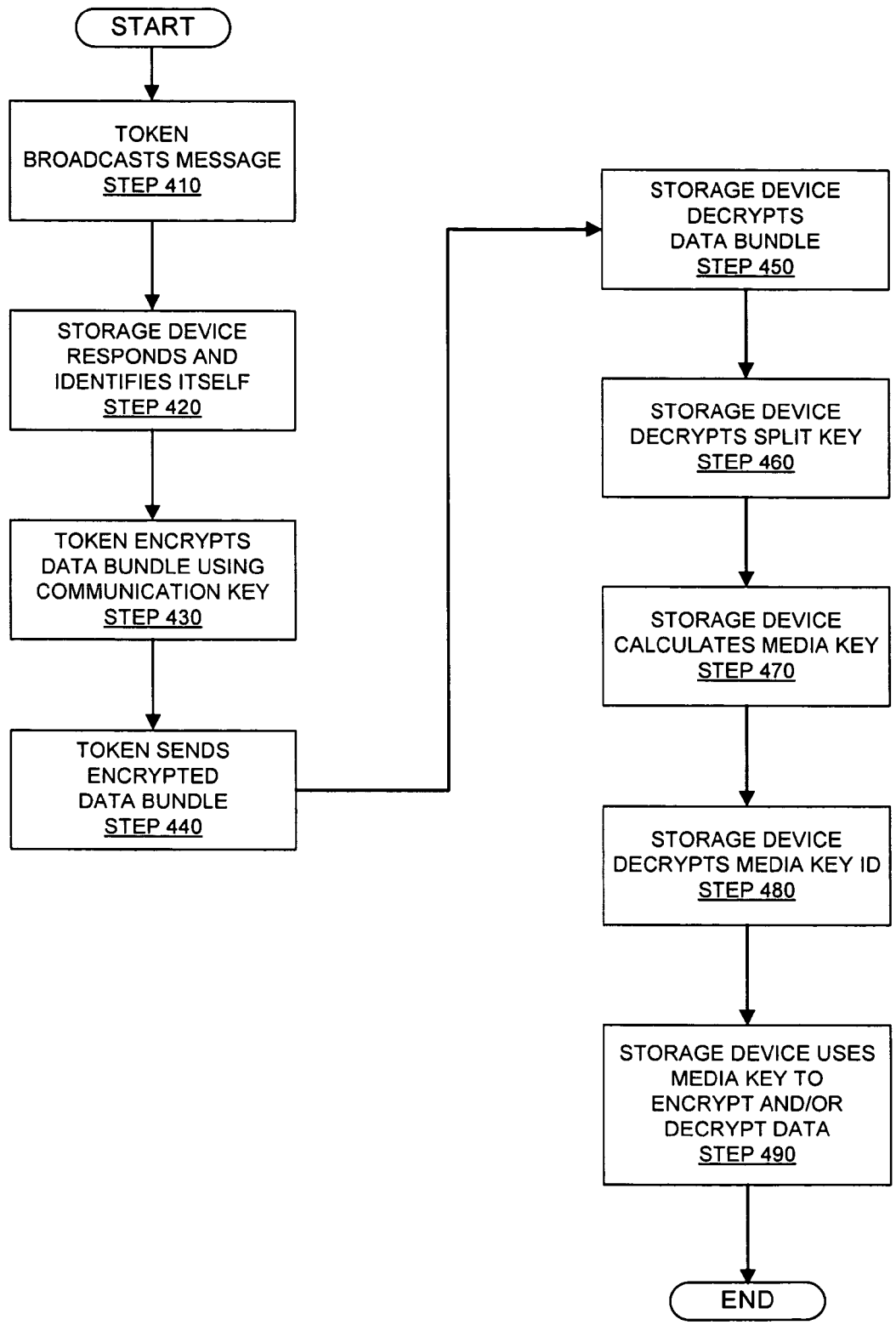

In STEP 230, the storage device accesses the protected media key on the token. FIG. 4 shows a flowchart for accessing the protected media key in accordance with one or more embodiments of the invention. Initially, once the token has joined the network (connecting the storage device), the token may make a broadcast communication across the network including one or more unique identification numbers identifying one or more storage devices (STEP 410). The storage devices that recognize their unique identification numbers may respond to this broadcast with a message that includes an additional identification number (e.g., an Ethernet MAC address) to facilitate communication between the storage device and the token (STEP 420).

In one or more embodiments of the invention, the response message from the storage device may also include an incrementing key load number. In other words, every time the storage device sends a message to the token requesting access to the protected media key stored on the token, the message may include a load number that is higher than the previous load number. In one or more embodiments of the invention, the load number is recorded by the token and the token may abort communication with the storage device if the current load number is smaller than the largest load number on record. In one or more embodiments of the invention, the load number sent by the storage device is reset every time a new token joins the network. Those skilled in the art, having the benefit of this detailed description, will appreciate that the key load number may be used to prevent playback attacks from older token versions.

In STEP 430, the data bundle stored on the token may be encrypted using the communication key, a predetermined encryption algorithm, and a newly generated nonce. In one or more embodiments of the invention, the network that connects the storage device and the token may be largely hidden and thus unauthorized devices could be added to intercept transmissions. Accordingly, encrypting the data bundle on the token prior to transmission provides an added level of security against eavesdropping.

In STEPS 440 and 450, the storage device receives the encrypted data bundle from the token and may decrypt the data bundle using the communication key, a pre-defined decryption algorithm, and the nonce used in STEP 430. In STEP 460, the storage device may decrypt the encrypted split key (i.e., the protected media key) using a pre-defined decryption algorithm, the wrap key, and the nonce used in STEP 340 in FIG. 3, included with the data bundle. In STEP 470, the storage device may calculate the media key from the decrypted split key and the auxiliary key. In one or more embodiments of the invention, the media key may be calculated from the equation:

$$MKey = TSkey \oplus AUXkey \qquad (1)$$

where MKey is the media key, TSkey is the decrypted split key, and AUXkey is the auxiliary key.

In STEP 480, the storage device may decrypt the media key ID associated with the media key using a pre-defined decryption algorithm and the wrap key. In one or more embodiments of the invention, once decrypted, the media key and media key ID may be stored in volatile memory in the storage device. In STEP 490, the storage device may use the media key and the media key ID to encrypt and/or decrypt data on the storage medium of the storage device.

In one or more embodiments of the invention, the storage device decrypts the creation time stamp (STEP 360 in FIG. 3) associated with the protected media key prior to decrypting the encrypted split key. In one or more embodiments of the invention, the storage device may record the creation time stamp of each protected media key that has been successfully retrieved. In one or more embodiments of the invention, the storage device may abort downloading the protected media key when the present creation time stamp is prior to the last recorded creation time stamp. Those skilled in the art, having the benefit of this detailed description, will appreciate that the creation time stamp may ensure that old data is not being replayed.

As discussed above, in one or more embodiments of the invention, both the KMS and the storage device must have the same device keys (e.g., auxiliary key, wrap key, and communication key) to protect and access the media key and media key ID. As also discussed above, the KMS may be responsible for managing (e.g., creating, revoking, updating, etc.) the device keys. Accordingly, it may be necessary to protect the device keys when they are conveyed between the KMS and the storage device. In one or more embodiments of the invention, the devices key may be transferred separately and prior to transferring the one or more media keys.

Figure 5:
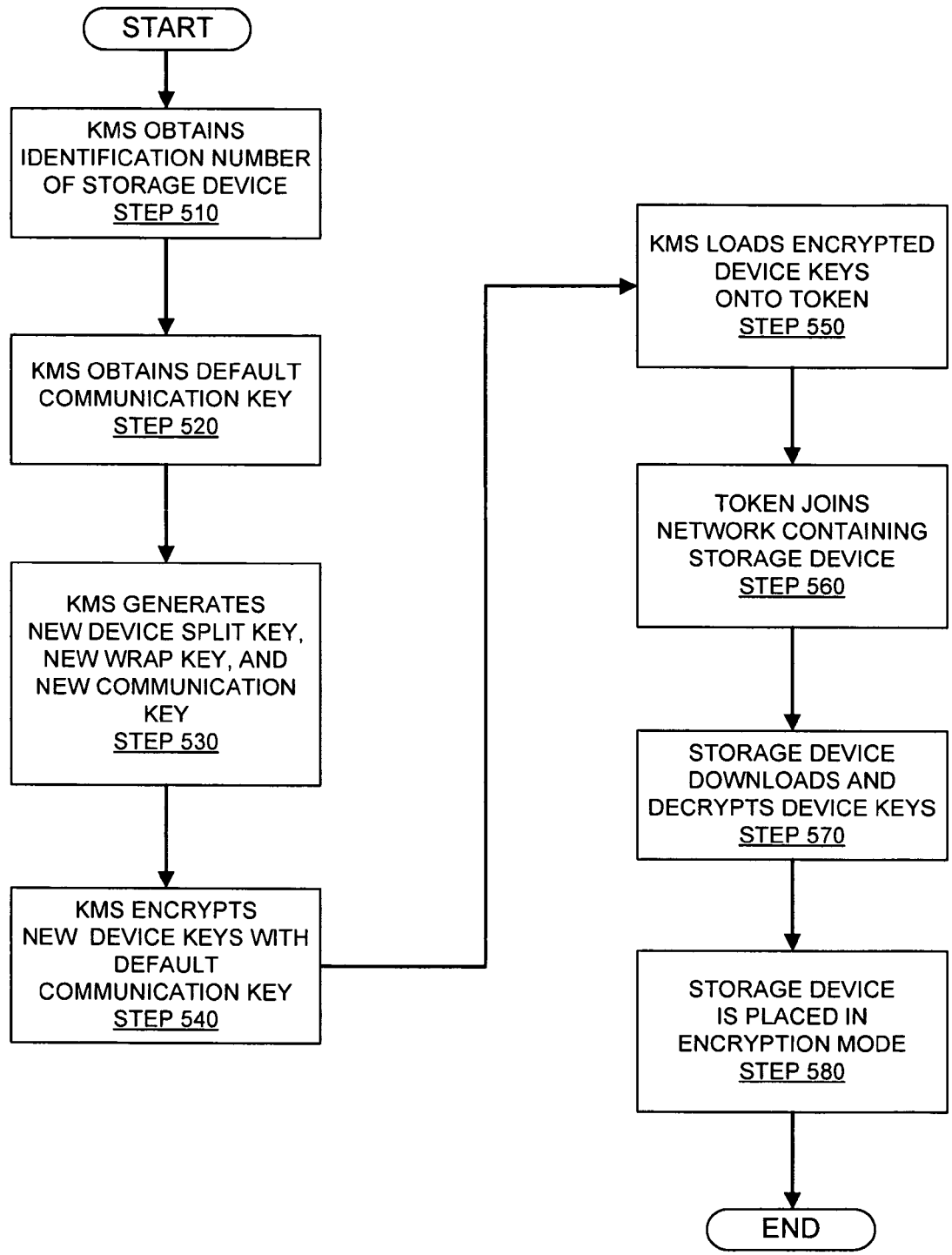

FIG. 5 shows a flowchart for protecting the device keys in accordance with one or more embodiments of the invention. In STEP 510 and STEP 520, an identification number (e.g., a serial number) of the storage device and the default communication key (PCkey) are provided to the KMS or the user of the KMS. In one or more embodiments of the invention, both the identification number and the PCkey are pre-loaded into the storage device by the manufacturer of the storage device. The identification number may be of any length provided it is sufficient to ensure no two (or more) devices have the same identification number.

In STEP 530, the KMS generates a new auxiliary key, a new wrap key, and a new communications key (e.g., via a random number generator). In STEP 540, the new auxiliary key, the new wrap key, and the new communications key are encrypted using the default communication key (PCkey) and a pre-defined encryption algorithm. In one or more embodiments of the invention, the pre-defined encryption algorithm may require additional parameters such as a nonce.

In STEP 550, the KMS stores the encrypted device keys (i.e., the new auxiliary key, the new wrap key, and the new communications key) onto the token. As discussed above, the token may be connected to the KMS by an Ethernet connection, a fiber optic connection, an infra-red connection, or any other type of connection that is known in the art.

In STEP 560, the token joins the network (connecting the storage device). STEP 560 is essentially the same as STEP 220 in FIG. 2. In STEP 570, the storage device downloads the encrypted device keys from the token and decrypts them using the default communication key (PCkey). In one or more embodiments of the invention, the device keys may be erased from the token after the storage device has downloaded the device keys. In one or more embodiments of the invention, once decrypted, the device keys are stored in non-volatile memory in the storage device. The storage device may use these device keys to decrypt media keys received in the future. In one or more embodiments of the invention, downloading and decrypting the new device keys places the storage device in permanent encrypting mode (as discussed above) (STEP 580).

In one or more embodiments of the invention, a second set of device keys (i.e., a second auxiliary key, a second wrap key, a second communication key) may be created by the KMS. The second set of device keys may be used to replace the original set of device keys or may be used in addition to the original set of device keys. The second set of device keys may be encrypted by the KMS using the original auxiliary key or the original wrap key, and then transferred using a token to the storage device. The storage device may then decrypt the second set of device keys using the original auxiliary key or the original wrap key.

In one or more embodiments of the invention, since the original wrap key and the original auxiliary key are never exposed in plain text, they are useful for protecting the second set of device keys. Similarly, a third set of device keys may be generated and encrypted by the KMS using any previously generated wrap key or auxiliary key (i.e., original wrap key, second wrap key, original auxiliary key, second auxiliary key, etc.).

Figure 6:
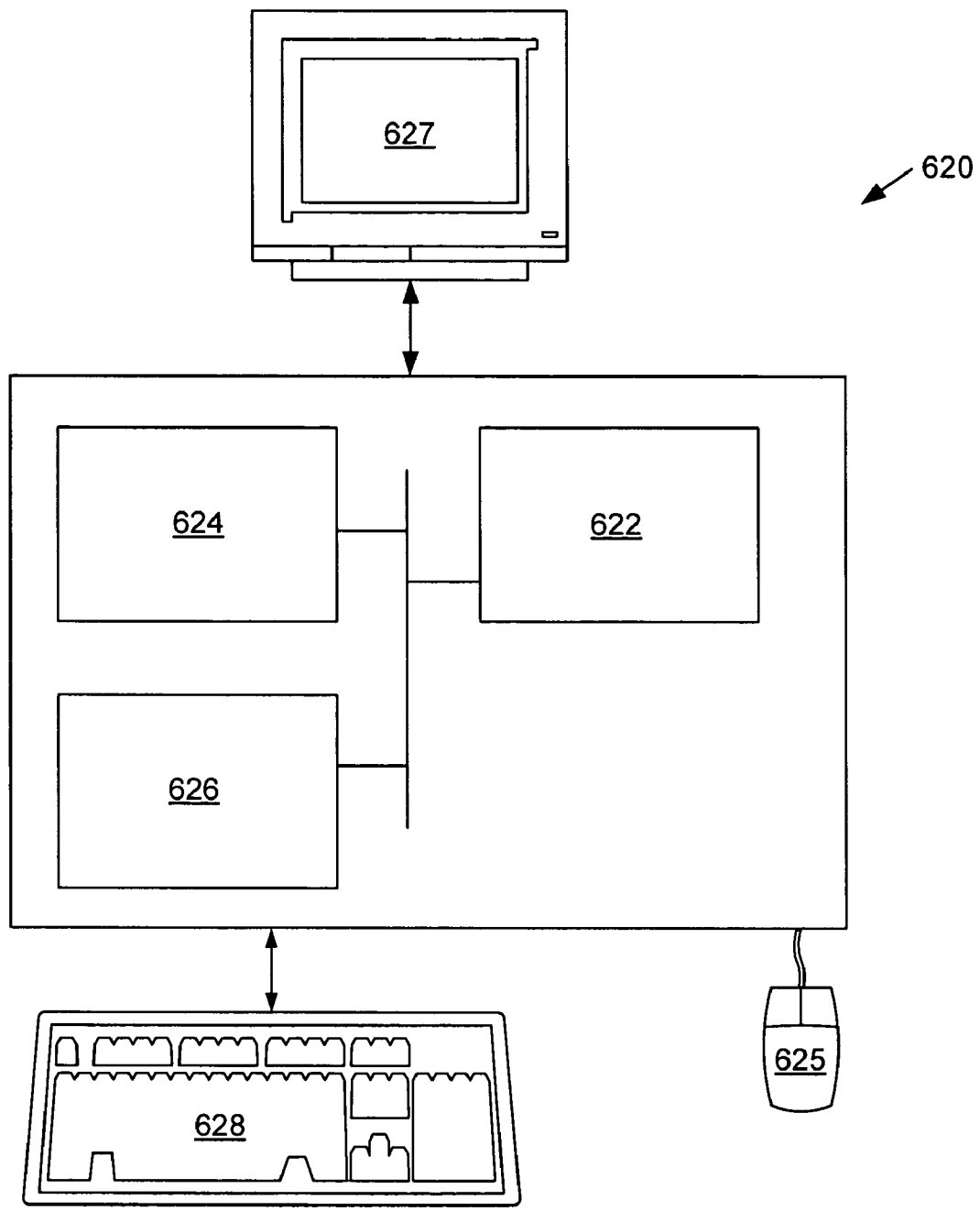
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., the key management station, the token, the one or more storage devices, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of protecting a media key comprising:

obtaining, by a key management station (KMS) comprising a first processor, the media key, a media key identification, and an auxiliary key, wherein the media key identification identifies the media key;

calculating, by the KMS, a split key using the media key and the auxiliary key;

encrypting, by the KMS, the split key using a wrap key to generate an encrypted split key;

encrypting, by the KMS, the media key identification to obtain an encrypted media key identification;

assembling, by the KMS, a data bundle comprising the encrypted media key identification and the encrypted split key;

storing the data bundle and a communication key on a token comprising a second processor, wherein the token is separate from the KMS;

encrypting, by the token, the data bundle using the communication key to obtain an encrypted data bundle; and sending, from the token, the encrypted data bundle to a storage device comprising a third processor, wherein the storage device is separate from the KMS and the token, wherein the storage device is removably connected to a network, and wherein the storage device comprises a non-volatile memory and a volatile memory, wherein the media key and the media key identification are extracted from the encrypted data bundle by the storage device, wherein, upon extracting the media key and the media key identification form the encrypted data bundle, the storage device generates an encrypted data item using the media key and the media identification key, and wherein the storage device stores the encrypted data item and the media key identification in the non-volatile memory, and wherein the storage device stores the media key in the volatile memory so that the media key is erased if the storage device is disconnected from the network.

2. The method of claim 1, wherein calculating the split key comprises performing an exclusive-or function on the media key and the auxiliary key.

3. The method of claim 1, wherein encrypting the split key comprises using a pre-defined encryption algorithm and a nonce comprising a first time stamp recording a creation of the media key, wherein the data bundle further comprises the nonce.

4. A method of managing device keys comprising:

obtaining, by a key management station (KMS) comprising a first processor, a default communication key and a plurality of device keys comprising a first auxiliary key, a first wrap key, and a first communication key;

encrypting, by the KMS, the plurality of device keys using the default communication key to generate a plurality of encrypted device keys;

storing the plurality of encrypted device keys on a token comprising a second processor, wherein the token is separate from the KMS;

sending, from the token, the plurality of encrypted device keys to a storage device comprising a third processor, wherein the storage device is separate from the token and the KMS, wherein the storage device is removably connected to a network, and wherein the storage device comprises a non-volatile memory and a volatile memory;

sending, from the KMS, a data bundle comprising an encrypted media key identification and a first protected media key to the token;

encrypting, by the token and after sending the plurality of encrypted device keys, the data bundle using the communication key to obtain an encrypted data bundle; and sending, from the token, the encrypted data bundle to the storage device, wherein the first auxiliary key and the first wrap key used by the KMS to generate the first protected media key, wherein the storage device extracts a media key from the first protected media key, wherein the storage device extracts a media key identification from the encrypted media key identification, wherein the media key identification identifies the first media key, wherein, upon extracting the media key and the media key identification, the storage device generates an encrypted data item using the media key and the media key identification, and wherein the storage device stores the encrypted data item and the media key identification in the non-volatile memory, and wherein the storage device stores the media key in the volatile memory so that the media key is erased if the storage device is disconnected from the network.

5. The method of claim 4, further comprising:

obtaining, by the KMS, a second auxiliary key, a second wrap key, and a second communication key;

encrypting, by the KMS, the second auxiliary key, the second wrap key, and the second communication key using the first split key; and storing the encrypted second auxiliary key, the encrypted second wrap key, and the encrypted second communication key on the token, wherein the second auxiliary key and the second wrap key are used by the KMS to generate a second protected media key.

6. The method of claim 4, further comprising:

erasing the token after sending the encrypted first device key, the encrypted first wrap key, and the encrypted first communication key to the storage device.

7. A system for storing data comprising:

a key management station (KMS) comprising a first processor and configured to:

obtain a media key, a media key identification, and an auxiliary key, wherein the media key identification identifies the media key, calculate a split key using the media key and the auxiliary key, encrypt the split key using a wrap key to generate an encrypted split key, encrypt the media key identification to obtain an encrypted media key identification, and assemble a data bundle comprising the encrypted media key identification and the encrypted split key;

a token comprising a second processor and configured to:
  store the data bundle and a communication key, and
  generate an encrypted data bundle from the data bundle using a communication key, wherein the token is separate from the KMS, and
  send the encrypted data bundle to a storage device; and
a storage device removably connected to a network, the storage device comprising a third processor, a non-volatile memory and a volatile memory, the storage device configured to:
  extract the media key and the media key identification from the encrypted data bundle,
  generate, upon extracting the media key and the media key identification, and encrypted data item using the media key and the media key identification,
  store the encrypted data item and the media key identification in the non-volatile memory, and
  store the media key in the volatile memory so that the media key is erased if the storage device is disconnected from the network,
  wherein the storage device is separate from the token and the KMS.

8. The system of claim 7, wherein the token is further configured to store a device key.

9. The system of claim 8, wherein the token is further configured to send the device key to the storage device, and wherein the storage device is further configured to store the device key in the non-volatile memory.

10. The method of claim 1, further comprising:
receiving, by the token and before sending the encrypted data bundle, a message comprising a key load number form the storage device; and
comparing, by the token and before sending the encrypted data bundle, the key load number from the storage device with a key load number recorded by the token,
wherein sending the encrypted data bundle is based on the key load number from the storage device exceeding the key load number recorded by the token.

11. The method of claim 1, further comprising:
broadcasting, by the token and before sending the encrypted data bundle, a serial number of the storage device on a network comprising the storage device; and
receiving, in response to broadcasting the serial number, a media access control (MAC) address of the storage device from the storage device.

12. The method of claim 3, further comprising:
extracting, by the storage device, the first time stamp from the data bundle; and
comparing, by the storage device, the first time stamp to a second time stamp recording a creation of a media key previously obtained by the storage device,
wherein encryption of the data item by the storage device is based on the first time stamp postdating the second time stamp.

13. The method of claim 1, further comprising:
obtaining, by the KMS, a default communication key and a plurality of device keys comprising a first auxiliary key, a first wrap key, and a first communication key;
encrypting, by the KMS, the plurality of device keys using the default communication key to generate a plurality of encrypted device keys;
storing the plurality of encrypted device keys on the token; and
sending, from the token, the plurality of encrypted device keys to the storage device,
wherein the storage device decrypts the plurality of encrypted device keys using the default communication key.

14. The method of claim 13, further comprising:
storing the plurality of device keys in non-volatile memory of the storage device.

15. The method of claim 1, wherein the data bundle further comprises an authentication tag.

16. The method of claim 1, wherein the token is disconnected from the KMS after the data bundle is stored on the token, and wherein the token is operatively connected to the storage device after the token in disconnected form the KMS.

17. The method of claim 4, wherein the default communication key is provided by a manufacturer of the storage device.

18. The system of claim 7, wherein the token is disconnected from the KMS after the data bundle is stored on the token, and wherein the token is operatively connected to the storage device after the token is disconnected from the KMS.

* * * * *